July 9, 1963
J. MAY
3,096,841
MOTOR SCOOTER HAVING DETACHABLE POWER TRAILING SECTIONS
Filed March 12, 1962
2 Sheets-Sheet 1
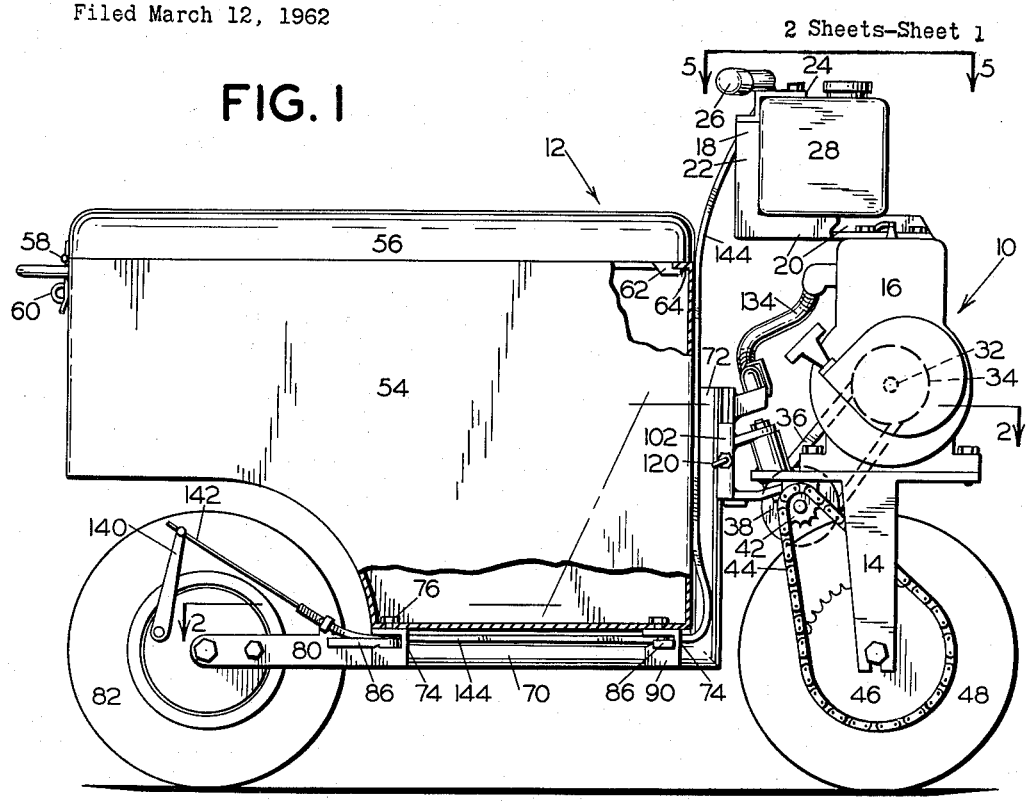
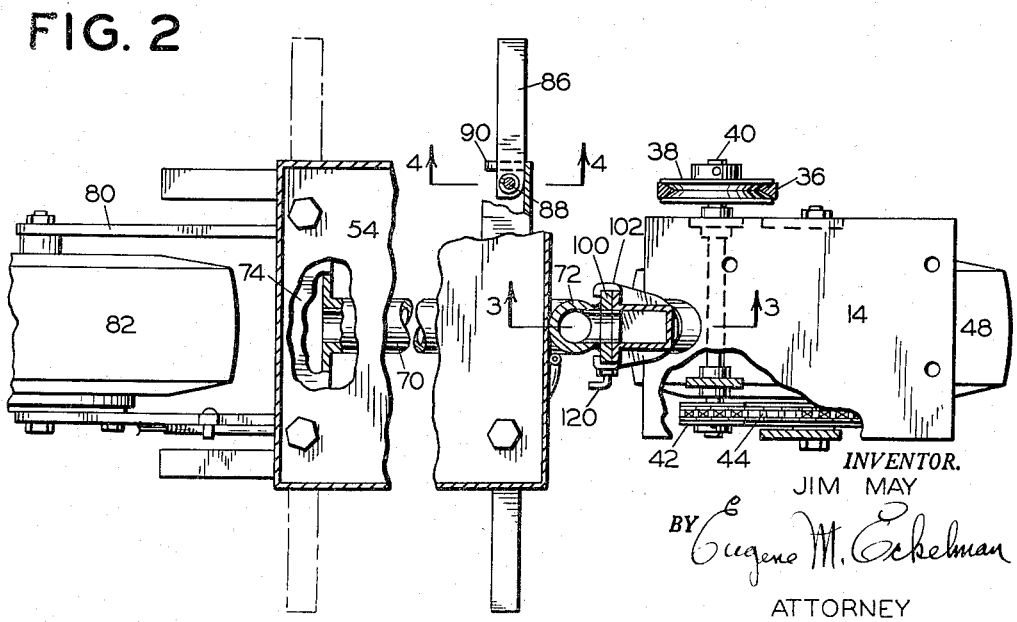
INVENTOR.
JIM MAY
BY Eugene M. Eckelman
ATTORNEY July 9, 1963 J. MAY 3,096,841
MOTOR SCOOTER HAVING DETACHABLE POWER TRAILING SECTIONS
Filed March 12, 1962 2 Sheets-Sheet 2
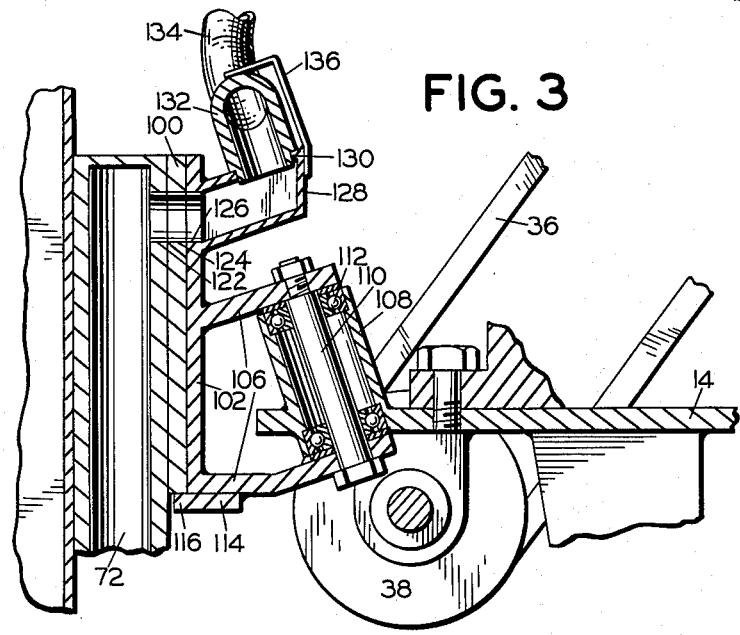
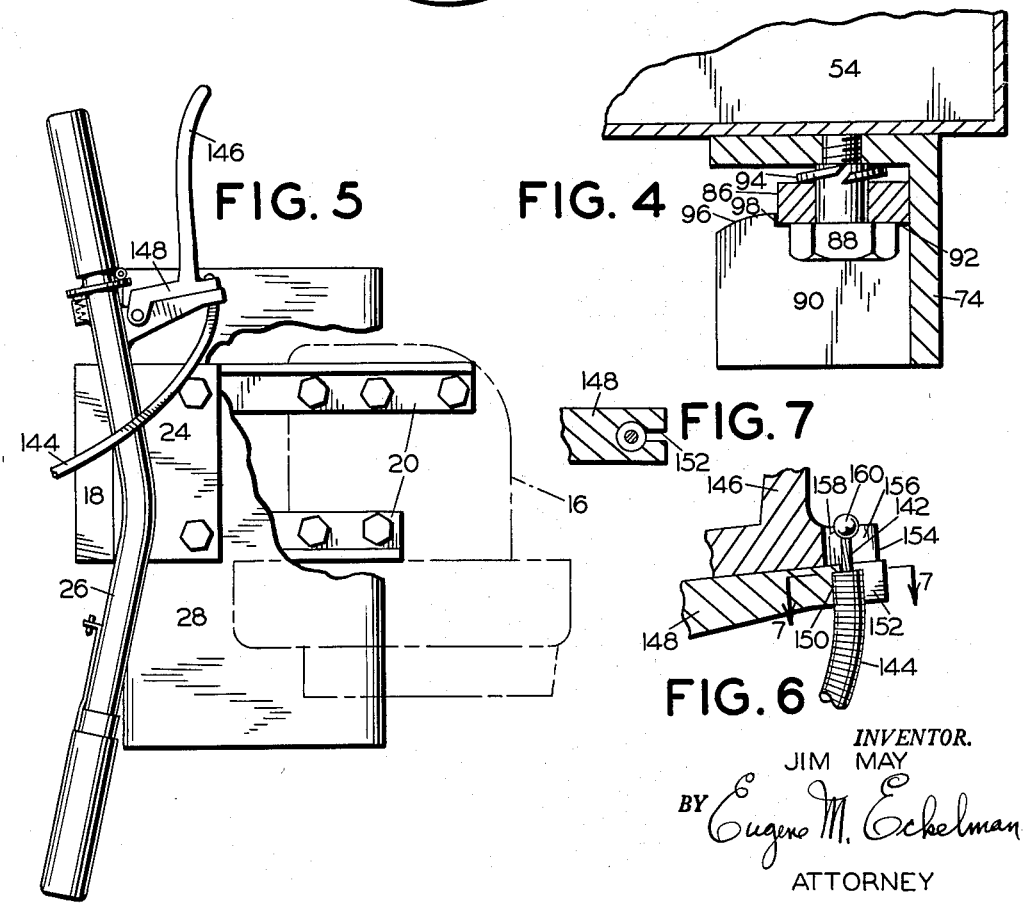
INVENTOR.
JIM MAY
BY Eugene M. Eckelman
ATTORNEY United States Patent Office 3,096,841
Patented July 9, 1963

3,096,841
MOTOR SCOOTER HAVING DETACHABLE
POWER TRAILING SECTIONS
Jim May, 12110 SE. Pine, Portland, Oreg.
Filed Mar. 12, 1962, Ser. No. 179,169
4 Claims. (Cl. 180—13)

This invention relates to new and useful improvements in motor scooters.

A primary object of the present invention is to provide a motor scooter of a knock-down structure facilitating its handling and transporting from one place to another.

It is a more particular object to provide a motor scooter employing a pair of separable wheeled sections one of which comprises a power unit and the other of which comprises a trailing riding section.

It is another object to provide novel connecting means between the power and trailing sections which facilitates the separation of these sections.

Still another object is to provide improved frame structure for connecting and disconnecting power and trailing sections of the scooter and also disconnecting exhaust means associated therewith.

Briefly stated, the present invention comprises two basic parts or sections one of which comprises a front wheeled section carrying a power unit and the other of which comprises a trailing wheeled section having a receptacle which serves as the seat. The two sections employ novel framework and connecting means whereby said sections may be readily connected or disconnected in order that they may be parted for easy handling and compact storage or transportation. A novel connection with a brake cable is provided to facilitate knocking down of the scooter. The trailing section has an enlarged receptacle which serves to transport a large quantity of material and to provide a seat for one or more riders.

The invention will be better understood and additional objects thereof will become more apparent from the accompanying specification and claims considered together with the accompanying drawings, wherein like numerals of reference indicate like parts, and wherein:

FIGURE 1 is a side elevational view of the present motor scooter;

FIGURE 2 is a foreshortened sectional view, slightly enlarged and with parts broken away, taken on the line 2—2 of FIGURE 1;

FIGURE 3 is an enlarged fragmentary sectional view taken on the line 3—3 of FIGURE 2;

FIGURE 4 is an enlarged sectional view taken on the line 4—4 of FIGURE 2;

FIGURE 5 is an enlarged fragmentary plan view taken on the line 5—5 of FIGURE 1;

FIGURE 6 is an enlarged detail view showing structure for detachably connecting the end of a brake cable to a hand operated brake lever; and FIGURE 7 is a sectional view taken on the line 7—7 of FIGURE 6.

Referring now in particular to the drawings and first to FIGURES 1 and 2, the present scooter comprises broadly a motor section 10 and a trailing section 12. Motor section 10 has a yoke frame 14 carrying a gasoline motor 16. Bolted to the latter is a frame member 18, also seen in FIGURE 5, which in a preferred construction has a pair of lower horizontal legs 20 bolted to the upper surface of motor 16, upright portions 22 on the legs 20 extending at right angles thereto, and a horizontal top plate 24 to which is secured, as by welding, handle bars 26. A fuel tank 28 is secured in place between the top plate 24 and the legs 20 by suitable means such as by bolts.

Motor 16 has an output shaft 32. Keyed to this shaft is a pulley 34 engaged by a V-belt 36 in turn engaging a lower pulley 38 operating on an elongated shaft 40. The opposite end of shaft 40 has a sprocket wheel 42 keyed thereto engaged by a sprocket chain 44 in turn engaging a sprocket wheel 46 secured to a wheel 48 which supports the motor section 10. Operation of the sprocket wheel 42 may be controlled through the intermediary of an automatic clutch not shown or if desired pulley 38 may comprise an expandable pulley operable by a flexible link extending to the handle bar.

The trailing section 12 of the present scooter comprises a receptacle 54, the lid 56 of which preferably is upholstered and forms a seat for one or more riders. One end of the lid 56 carries a hasp 58 and the receptacle carries a loop 60 engageable by the hasp for the purpose of locking the lid in place. The opposite end of the lid 56 has a hook 62 adapted for engagement under a rearwardly turned lip 64 on the upper end of the front wall of the receptacle, and for the purpose of obtaining access to the receptacle the hasp 58 is unhooked and the lid 56 moved rearwardly to disengage hook 62 from the lip 64.

As viewed in FIGURE 1 it is apparent that the receptacle 54 is box-like in structure and is of enlarged size. Thus, it is adapted to carry a large load, and additionally is capable of supporting at least two riders comfortably.

Frame means for supporting the receptacle 54 comprise a main frame portion 70 which extends longitudinally and centrally at the bottom of the receptacle and which includes an integral upwardly directed front portion 72. For a purpose to be described hereinafter the frame portions 70, 72 are tubular in form. Welded or otherwise secured to the frame portion 70 are a pair of angle iron cross arms 74, FIGURES 1 and 4, to which the receptacle 54 is bolted, as by bolts 76.

Extending rearwardly from the frame portion are yoke arms 80 for mounting a wheel 82.

As particularly shown in FIGURES 1, 2 and 4 the present scooter is provided with forward and rearward sets of foot rests 86 which are pivotally mounted on a pin 88 for rotation between an operative position extending outwardly from the side of the receptacle, as illustrated by the forward foot rests, FIGURE 2, and an inoperative position disposed longitudinally relative to the receptacle, as illustrated by the rearward foot rests in such figure. Foot rests 86 are held in their two positions by means of latch plates 90 secured in an upright position adjacent the outer ends of cross arms 74 and having an upper edge notch 92, FIGURE 4, extending from the attached edge of the plate 90 to a point substantially the width of foot rest 86. A spring washer 94 is mounted on the pin 88 and is confined between the foot rest 86 and the upper portion of cross arms 74. The unnotched portion of plate 90 is rounded at 96 and such unnotched portion forms a shoulder 98.

To swing the foot rests from their operative outwardly extending position to their inoperative longitudinally directed position they are merely lifted upwardly slightly against the action of spring 94 to clear the shoulder 98 whereby they can be rotated. Pivot pin 88 is located such that in the inoperative position of the foot rest, the latter outermost portion thereof is inwardly of plate 90. Thus, portions 96 prevent accidental outward rotation of the foot rests. In moving the foot rests from their inoperative position to their operative position, they are merely swung out, with the bottom surface thereof riding up over the rounded portion 96. When the foot rest is at right angles to the receptacle, it snaps into notch 92 and is held there by the spring 94.

Means for connecting the motor section 10 and trailing section 12 will now be described, particular reference being had to FIGURES 1, 2 and 3. Upright frame portion 72 of the trailing section has an integral forward projection in the form of a narrow plate 100 which is adapted to be engaged in a rearwardly facing channel member 102. Channel member 102 has a pair of forwardly projecting integral arms 106 engaging the ends of a spindle housing 108 forming an integral part of the motor section frame 14. A rotatable connection is provided between the arms 106 and the spindle housing 108 through the medium of a spindle 110 and bearings 112.

Secured to the bottom of channel member 102 and the lower one of arms 106 is a horizontal plate 114 which projects at 116 rearwardly of the structure 102. In the connected condition of the parts, the plate 100 of the trailing section is confined within the channel 102 and rests on the projecting portion 116 of plate 114 to provide support for the front end of the trailing section. For providing a positive securement between these parts a set screw 120 is provided in the channel member and is adapted to engage the edge of plate 100.

With reference to FIGURE 3, upright frame portion 72 is apertured at 122 and plates 100 and channel members 102 are apertured at 124 and 126 respectively, these apertures all being in registry and communicating with a hollow extension 128 integral with the channel 102. The upper wall of extension 128 has an aperture 130 which receives rotatably a hollow connector 132 from which leads a flexible exhaust tube or pipe 134 forming a part of the power unit. Rotatable interengagement of connector 132 on the extension 128 is accomplished by a spring finger 136 forming an integral part of extension 128 and hook shaped to engage the connector. The axes of spindle 110 and connector 132 are aligned to facilitate efficient turning of the motor unit on the spindle and the connector 132.

Referring to FIGURES 1 and 5–7 the present scooter has rear wheel braking operating means comprising a spring operated brake arm 140 and a flexible cable 142 connected thereto and operating through a flexible casing 144. The cable assembly leads along the underside of the receptacle 54 and upwardly along the forward end thereof to a hand brake lever 146 pivotally mounted on a bracket 148 forming a part of the handle bar 26. Bracket 148 is apertured at 150, FIGURE 6, for receiving the upper end of casing 144 and has slot 152 leading from the aperture 150 and opening through the end edge of the bracket, this slot being slightly wider than the diameter of cable 142 but of less width than casing 144.

Hand lever 146 has a projection 154 slotted at 156, and this slotted portion opens through an end edge of the projection. Slot 152 is of a width to receive the cable 142 and projection 154 is recessed at 158 for receiving a ball end 160 of cable 142.

To attach the cable 142 to the brake lever 146 it is only necessary that it be pulled manually through the casing 144 a distance sufficient such that it can be moved laterally and simultaneously into slots 152 and 156 and positioned such that its ball end 160 seats in recess 158. Thereupon the cable is released and the spring action operating on brake arm 140 seats positively the ball end of 160 into recess 158. Thereupon the adjacent end of casing 144 is mounted in aperture 150.

Detachment of cable 142 from lever 146 is accomplished merely by first removing casing 144 from aperture 150, operating lever 146 to pull the cable 142 outwardly, holding the cable manually while returning the lever 146 to its retracted position, and then moving the cable laterally outwardly through the slots 152 and 156.

Thus, in accordance with the present invention there is provided a motor scooter having a front motor section and a trailing section which are readily separable to provide for easy handling and storage. The separation of the sections is accomplished merely by releasing the cable 142 and its casing 144 from the brake lever 146 and its mounting bracket 148 and loosening set screw 120 whereby plate 100 is slidable out of channel member 102. The device in its knocked down condition can be easily handled and can be assembled quickly without tools at the place of use. The receptacle being of substantially enlarged size can carry a large load.

Receptacle 54 is rigidly reinforced by the frame member 70 and its upward extension 72 which importantly serve also to carry the exhaust rearwardly of the scooter. This elongated exhaust extension also serves as a muffler to reduce the noise of the motor unit.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. A motor scooter comprising a motor section, wheel means on said motor section, spindle means on said motor section, at least one rearwardly extending arm on said spindle means, a channel member carried by said arm, exhaust pipe means on said motor section, a trailing section, wheel means on said trailing section, exhaust pipe means on said trailing section comprising a hollow frame support member for the latter extending longitudinally thereunder and upwardly along the forward end, a plate member on the upwardly extending portion of said hollow frame member adapted for detachable connection in said channel member, and means detachably connecting the exhaust pipe means on said motor section and said trailing necting means on said motor section, spindle means on 2. A motor scooter comprising a motor section, wheel means on said motor section, rearwardly projecting connecting means on said motor section, spindle means on said motor section for steering the latter, a trailing section, wheel means on said trailing section, an elongated receptacle on said trailing section having a top wall forming a seat for one or more riders, frame means extending upwardly adjacent the front wall of the receptacle, and forwardly projecting connecting means on said frame means arranged to engage the rearwardly projecting means on said motor section in a longitudinally rigid, vertically slidable connection for detachably connecting said motor section with said trailing section.

3. The motor scooter of claim 2 wherein said connecting means includes a top opening rectangular socket in one of said motor and trailing sections and a plate on one of said other motor and trailing sections for vertical reception in said socket to provide the longitudinally rigid, vertically slidable detachable connection.

4. The motor scooter of claim 2 wherein said top wall of the receptacle is movable relative to the receptacle to provide access to the latter.

References Cited in the file of this patent

UNITED STATES PATENTS

| | | |
|---|---|---|
| 1,546,805 | Pierre | July 21, 1925 |
| 1,607,402 | Leonardi | Nov. 16, 1926 |
| 1,794,630 | Linn | Mar. 3, 1931 |
| 2,377,389 | Waters | June 5, 1945 |
| 2,445,058 | Fields | July 13, 1948 |
| 2,638,174 | Mennesson | May 12, 1953 |
| 2,771,145 | Peters | Nov. 20, 1956 |
| 2,839,146 | Bouffort | June 17, 1958 |
| 2,854,857 | Gleasman et al. | Oct. 7, 1958 |

FOREIGN PATENTS

| | | |
|---|---|---|
| 49,832 | Norway | Dec. 7, 1931 |
| 58,381 | France | June 24, 1953 |
| 992,681 | France | July 11, 1956 |
| 1,184,375 | France | Feb. 2, 1959 |